Patented Sept. 30, 1930

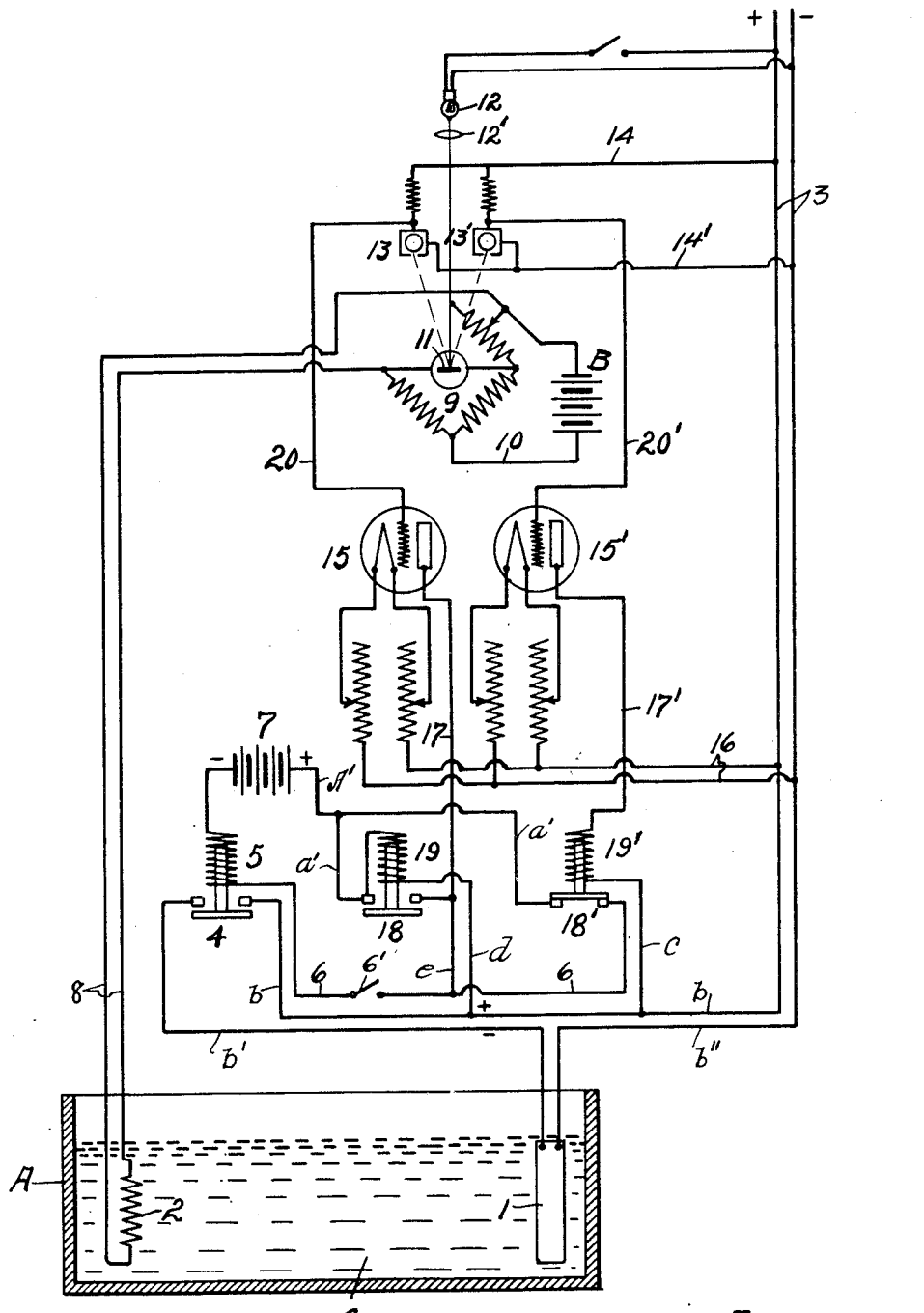

1,776,901

UNITED STATES PATENT OFFICE

HARRY ESSEX, OTTO GELORMINI, AND TERESA MASTERSON, OF SYRACUSE, NEW YORK

CONSTANT-TEMPERATURE REGULATOR

Application filed March 25, 1925, Serial No. 18,183. Renewed October 16, 1929.

This invention relates to an improved method of and apparatus for maintaining a constant temperature of baths, ovens and other matter and is particularly useful in investigations of constant temperature phenomena in chemical and physical research work.

We are aware that certain apparatus is at present in use for similar purposes in which one or more electric heating elements in the bath are controlled directly or indirectly by means of a mercury column wholly or partially immersed in the same bath and adapted to cooperate with an electrical contact which, together with the mercury column, may be utilized for operating one or more relays in controlling the heating circuit or circuits.

It has been found, however, that this mercury column control is impracticable or at least unsatisfactory for very sensitive temperature control owing to the fouling of the mercury surface by sparking, the difference in temperature between the periods of making and breaking the circuit at the point between the mercury and its contact due to the adhesion of the mercury to the platinum contact member, the lag in the temperature of the regulator and in the action of the thermo relay when used.

Furthermore this mercury contact control requires frequent repurification of the mercury and also requires considerable time for adjustment for operation at different temperatures, such adjustment for a particular temperature being extremely difficult and laborious.

The main object of the present invention is to not only remove the objections above mentioned but also to render the apparatus more sensitive, accurate and responsive to very small changes in temperature of the bath and thereby to obtain a more nearly constant temperature of the bath than has heretofore been practised.

In other words, instead of relying upon the relatively slow and more or less variable results produced by a mercury contact, it is designed to use a resistance element such as a resistance thermometer bulb or its equivalent having a large resistance temperature co-efficient as the primary source of temperature regulation of the bath or other body.

Another object is to connect said resistance thermometer in one side of a Wheatstone bridge or equivalent electrical balance capable of instantly responding to the slightest variation from a selected constant temperature of the bath or other material from which the resistance thermometer derives its temperature and, at the same time, to provide simple and highly efficient automatic means influenced or controlled by any unbalanced condition of the Wheatstone bridge, or its equivalent, in the control of one or more elements used in heating the bath or other material, the temperature of which is to be regulated.

Other objects and uses relating to specific parts of the apparatus will be brought out in the following description.

The drawing represents a diagrammatic view of an apparatus for carrying out the objects stated.

As illustrated, this apparatus comprises a vat —A— containing a body —a— of water, or other liquid commonly known as a "bath," the temperature of which is to be regulated. One or more electric heaters —1— and a resistance thermostat —2— are wholly or partially immersed in the bath —a—, the heater —1— serving to impart to the liquid the desired heat while the resistance thermostat —2— through the medium of other portions of the apparatus, presently described, serves to control the temperature of the bath as produced by the heater —1—.

The heater —1— is connected in an electric circuit —3— which, in turn, may be connected to any suitable electric generator, preferably of the D. C. type, said circuit including therein the movable member —4— of an electrical relay —5— having its winding connected in a local circuit —6— deriving current from a source of electric energy such as a battery —7—.

The resistance thermostat —2— is electrically connected by wires —8— in one side of a Wheatstone bridge —9— which, in turn, is connected by wires —10— to a suitable electric generator —B—, preferably of the battery type, and is provided with a galvanometer mirror —11— adapted to receive and reflect a beam of light from any available source as —12—, through a lens as —12'— and from a single-point light positioned in such manner that its rays will be at substantially right angles to the mirror when the resistances of the bridge —9— are in balance.

Owing to the large resistance temperature co-efficient of the resistance element —2— and to the high sensitivity of the galvanometer employed, it is evident that any appreciable change in the temperature of said resistance element either above or below the predetermined temperature as produced by the temperature of the bath —a— will cause a corresponding unbalancing of the bridge —9— and resultant angular adjustment of the mirror —11— in one direction or the other from its balanced position.

This angular adjustment of the mirror —11— may be utilized for deflecting the beam of light therefrom to one or the other of a pair of photoelectric selenium cells —13— and —13'— which are located at opposite sides of the direct line of light from the source —12— to the mirror so that when the mirror —11— is adjusted in one direction by the unbalancing of the bridge —9— the beam of light will be deflected upon one of the cells or when adjusted in a reverse direction it will be deflected upon the other cell in a manner hereinafter more fully described.

These cells —13— and —13'— are electrically connected in parallel across the heating circuit —3— by means of wires —14— and —14'— and, as is well-known, the electric resistance thereof decreases with the intensity of light directed thereto by the angular adjustment of the mirror —11—.

The variable resistance of the cells may be utilized in the operation of suitable amplifiers, such as thermionic tubes or audions —15— and —15'— of the "three-electrode" type, one for each cell. The filament of each tube is connected across the heater circuit —3— by wires —16— while the plate electrodes are connected respectively by wires —17— and —17'— to a movable switch member —18— of a relay —19— and to the winding of another relay —19'— having a movable switch member —18'—, the grids of the tubes being electrically connected by wires —20— and —20'— to the corresponding positive terminals of their respective cells —13— and —13'—.

The windings of the relays —19— and —19'— are connected to one side, preferably the positive side, of the heating circuit —3—, the winding —19— being also connected to the local battery circuit —6— which is provided with a controlling switch —6'—.

Operation

When the bath —a— is cold and the device inoperative, except for the energization of light 12, and the energization of the circuit through the resistance thermostat —2— and Wheatstone bridge —9—, the main switch will be open, as will switches —4—, —6'— and —18—, switch —18'— being closed.

Under these circumstances the angular adjustment of the mirror —11— will be such that the beam of light from source —12— will be reflected toward the right and beyond cell —13'—.

When it is desired to make the device operative, the switch —6'— is closed and the circuit through relay —5—, battery —7—, switch —18'— and wire —6— will be complete, thereby energizing relay —5—, which will close switch —4—. The main switch will then be closed which will energize heater —1— through switch —4— and circuit —3—.

At the same time, relay —19— will be energized through switch —18'—, wire —6— and circuit —17— which will result in the closing of switch —18—.

Relay —19'— will also be energized through circuit —17'— thereby opening switch —18'—, the lag in the opening of switch —18'— being sufficient to permit the energizing of relay —19— before switch —18'— is opened. Relay —19— will remain energized after the opening of switch —18'— through battery —7—, relay —5—, wire —6— and circuit —17—.

When the temperature in the bath —a— rises, the angular adjustment of the galvanometer mirror —11— will start to be reversed which will cause the beam of light reflected from the source —12— to gradually approach the cell —13'—. When the beam reaches cell —13'— the resistance in that cell will be reduced and the grid potential of amplifier —15'— will be reduced which will result in decreasing the current in circuit —17'— and relay —19'— and this will permit switch —18'— to close. The continued angular adjustment of the galvanometer mirror —11—, due to the continued rising of the temperature in bath —a—, will cause the beam of light to move from cell —13'— toward selenium cell —13—.

When the beam of light leaves cell —13'—, relay —19'— will again receive its full current and switch —18'— will be opened.

It will be understood that relay —5— continues to be energized through battery —7—, switch —18— and wire —6— so that the circuit through the heater —1— continues to be intact. When the beam of light falls on cell —13—, the resistance thereof will be reduced which will result in lowering the grid potential in amplifier —15— and reducing the current in circuit —17—and relay —19— which will permit switch —18— to open.

The opening of switch —18— (switch —18'— being open) breaks the circuit through battery —7— and relay —5— so that the latter becomes de-energized and the switch —4— opens, thereby breaking the circuit —3— through heater —1—.

If the beam of light passes beyond cell —13—, due to lag in the operation of galvanometer —2—, switch —18— will not be closed through the energization of relay —19— because the plate circuit of tube —15— will be completed only through battery —7—, the E. M. F. of which opposes the normal E. M. F. of plate —17— with the result that relay —19— will still not receive a sufficient amount of current so that it will become sufficiently energized to close switch —18—.

As the temperature in bath —a— falls, due to the fact that heater —1— is inoperative, the beam of light will return to cell —13— and pass beyond it toward selenium cell —13'—. This movement will produce no effect as the amount of current in plate circuit —17— remains insufficient to energize relay —19— and close switch —18—.

When the beam of light reaches cell —13'— the current in plate circuit —17'— is again reduced and switch —18'— is permitted to close which will complete the circuit through battery —7—, relay —5— and wire —6— and energize relay —5— which will result in closing switch —4— and completing the heater circuit through heater —1— and circuit —3—.

At the same time, due to the shunting out of battery —7— from plate circuit —17— by the closing of switch —18'—, relay —19— again receives the full amount of current through circuit —17— and becomes energized, thereby closing switch —18—.

If the beam of light moves beyond cell —13'—, due to lag in the operation of galvanometer —2—, relay —19'— will receive the full current of circuit —17'—, thereby becoming energized and opening switch —18'—. Relay —5—, however, will remain energized through switch —18—, and the heater circuit will remain closed.

As the temperature of bath —a— rises, the beam of light will return to cell —13'— and beyond, and the cycle of operation just described will be repeated, and the repetition of the cycle will continue as long as switch —6'— and the main switch are left closed.

The energizing circuit for the relay —19— is as follows:

From the positive side —b— of the line circuit —3— through wire —d—, relay winding —19—, wires —d'— and —a'— through the closed switch —18'—, wires —6—, —e—, and —17— through the amplifier —15— and returning through the negative wire —16— to the negative side of the line circuit —3—.

The energizing circuit for the relay —19'— is as follows:

From the positive side of the line circuit —3—, wires —b— and —c— through the relay winding —19'— and wire —17'— to the amplifier —15'— and return through the negative wire —16— to the negative side of the line circuit —3—.

In starting the heater —1— the switch —6'— is first closed thereby establishing a battery circuit from —7— through wires —A'— and —a'—, closed switch —18'—, wire —6—, switch —6'—, wire —6—, and relay winding —5— and return to the battery —7— thereby energizing the relay winding —5— to close the switch —4— so that when the main line circuit —3— is closed current from the main line will flow through the heater —1—.

This closing of the main switch in the line —3— causes the current to flow from the positive side of said line through the wires —b— and —d— and thence through the relay winding —19—, wires —d'— and —a'— through the closed switch —18'—, thence through wires —6—, —e— and —17— through the amplifier —15— and return through the negative wire —16— to the negative side of the line circuit —3— thereby energizing the relay winding —19— to close the switch —18— and shunting the battery circuit from the battery —7— through wires —A'— and —d'— thence through the previously closed switch —18— and wire —e—, closed switch —6'—, wire —6— and relay winding —5— and return to the battery —7— for holding the switch —4— in its closed position until the bath is heated to a predetermined temperature controlled by the thermostat —2— in the manner previously described.

The closing of the main line —3— will also cause the current to pass from the positive side of the line through wires —b— and —c— through relay winding —19'—, wire —17'—, amplifier —15'— and return through the negative wire —16— to the negative side of the line circuit —3— thereby energizing the winding —19'— to open the switch —18'— but the relay —19'— and its switch —18'— are constructed in such manner as to effect a slight lag in the opening of the switch —18'— until the switch —18— is closed.

That is, the lag in the operation of the relay —19'— may be produced by various means such, for example, as making its armature somewhat heavier than the armature 18 or by making the number of turns in the winding of the relay —19'— less than those in the winding of the relay —19— or by the use of a spring for closing the armature in addition to its weight.

On the other hand, the closing of the armature of the relay —19— might be assisted by a light spring. It will be noted, however, that in case the armature of the relay —19— should not close in advance of the opening of the armature of the relay switch —18'— these relays are always accessible for operation by hand if desired so that the armature —18— might be closed by hand in advance of the switch —18'—.

It will be obvious to those skilled in this art that certain elements of the apparatus shown and described may be replaced by equivalents or equally efficient substitutes and that it may be possible to eliminate one or more of said elements without sacrificing the efficiency of the apparatus, and, therefore, we do not wish to limit ourselves to the construction shown and described.

What we claim is:

1. In a control system for a temperature regulator for liquid baths, a source of heat for the bath, an electric resistance element immersed in the bath, the electrical resistance of the resistance element being variable and dependent upon the temperature of the bath, a photoelectric cell, a source of light, means including a galvanometer mirror for receiving and reflecting rays of light from said source to and from the cell and operable by variations in electrical resistance of the resistance element, and electrical means controlled by said cell for controlling the operation of the source of heat, the last-named means including a thermionic unit of the plural electrode type having its grid electrically connected to the cell circuit.

2. In an apparatus for maintaining a constant temperature of liquid baths, a source of heat for the bath, an electric resistance element immersed in the bath, the electrical resistance of the resistance element being variable with varying temperatures of the bath, a photoelectric cell, a thermionic unit of the plural electrode type having its grid connected to the cell circuit, a source of light, a Wheatstone bridge including therein said resistance element and provided with a mirror galvanometer operable by variations of electrical resistance in the resistance element said mirror being adapted to receive rays of light from said source and for deflecting them to and from the cell according to variations in the electrical resistance of said resistance element and thereby varying the potential impressed upon the grid of the thermionic unit, and means controlled by the potential impressed upon said grid for controlling the operation of the source of heat.

3. In a control system for a temperature regulator for liquid baths, a source of heat for the bath, an electric resistance element immersed in the bath, the electrical resistance of the resistance element being variable and dependent upon the temperature of the bath and being one arm of a Wheatstone bridge, the other three arms of the bridge being unaffected by temperature, a photoelectric cell, a source of light, means including a galvanometer mirror for receiving and reflecting rays of light from said source to and from the cell and operable by variations in electrical resistance of the resistance element, and means controlled by said cell for controlling the operation of the source of heat.

In witness whereof we have hereunto set our hands this 18th day of March, 1925.

HARRY ESSEX.
OTTO GELORMINI.
TERESA MASTERSON.